United States Patent
Mahkovec et al.

(10) Patent No.: US 8,977,653 B1
(45) Date of Patent: Mar. 10, 2015

(54) MODIFYING WEB PAGES TO REDUCE RETRIEVAL LATENCY

(75) Inventors: Ziga Mahkovec, San Francisco, CA (US); Rupesh Kapoor, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 12/818,068

(22) Filed: Jun. 17, 2010

(51) Int. Cl.
G06F 7/00 (2006.01)
G06F 17/30 (2006.01)

(52) U.S. Cl.
USPC ........... 707/802; 707/803; 707/800; 707/797; 707/769; 715/234; 715/243

(58) Field of Classification Search
CPC ...................... G06F 17/30286; G06F 17/30864
See application file for complete search history.

(56) References Cited

U.S. PATENT DOCUMENTS

| | | | |
|---|---|---|---|
| 7,031,968 B2 | 4/2006 | Kremer et al. | |
| 7,617,294 B1* | 11/2009 | Harding | 709/217 |
| 7,668,913 B1 | 2/2010 | Underwood et al. | |
| 7,779,352 B1 | 8/2010 | Underwood et al. | |
| 7,904,799 B1 | 3/2011 | Underwood et al. | |
| 2005/0165778 A1* | 7/2005 | Obata et al. | 707/5 |
| 2007/0136320 A1* | 6/2007 | Sah et al. | 707/100 |
| 2007/0226612 A1* | 9/2007 | Sun | 715/526 |
| 2008/0098296 A1* | 4/2008 | Brichford et al. | 715/234 |
| 2008/0195932 A1* | 8/2008 | Oikawa et al. | 715/234 |
| 2010/0070448 A1* | 3/2010 | Omoigui | 706/47 |
| 2010/0088668 A1* | 4/2010 | Yoshihama et al. | 717/105 |
| 2010/0281364 A1* | 11/2010 | Sidman | 715/713 |

* cited by examiner

*Primary Examiner* — Loan T Nguyen
(74) *Attorney, Agent, or Firm* — Fish & Richardson P.C.

(57) ABSTRACT

Methods, systems, and apparatus, including computer programs encoded on a computer storage medium, for generating modified web documents. In one aspect, a method includes retrieving a web document including markup language code and having references to resources external to the web document and parsing the retrieved web document to interpret the markup language code and identify references to resources external to the retrieved web document. Data relating to at least a portion of the resources external to the retrieved web document are retrieved, and a modified web document including the retrieved data is generated and stored for use in responding to a request for retrieval of content of the web document.

27 Claims, 4 Drawing Sheets

MODIFYING WEB PAGES TO REDUCE RETRIEVAL LATENCY

BACKGROUND

This specification relates to modifying web pages to decrease latency associated with retrieving the web pages.

Delivering web pages over the Internet allows computer users to receive search results, e-mail, news, games, entertainment, music, books, and web pages—all with a simple Internet connection. Web pages can include content such as text, graphics, audio, and computer scripts. Various content items included on a single web page are sometimes hosted by different Internet servers, and are retrieved when downloading the web page. In particular, a browser that retrieves a hypertext markup language (HTML) page and parses the page. Such pages commonly include elements that define numerous different features of the web page to be displayed to a user. Some of the features are defined within the HTML page, while other features are defined by specifying an address and/or other instructions for retrieving additional content. In the latter case, the browser makes a call to each specified address and/or in accordance with each set of instructions to retrieve the additional content, which may include images, JavaScript instructions, style sheets, and iframes (e.g., using an iframe tag that defines an inline frame which can be used to insert another web document). Web developers often use such features to incorporate previously defined content, to facilitate caching of styles or other resources (e.g., JavaScript, CSS style sheets and images) for use on related pages, and to avoid encoding all of the features of the web page into the HTML page itself.

SUMMARY

This specification describes technologies relating to modifying web pages to reduce retrieval latency.

In general, one innovative aspect of the subject matter described in this specification can be embodied in methods that include the actions of retrieving a web document including markup language code and having references to resources external to the web document and parsing the retrieved web document to interpret the markup language code and identify references to resources external to the retrieved web document. Data relating to at least a portion of the resources external to the retrieved web document is retrieved, and a modified web document including the retrieved data and markup language code from the retrieved web document is generated. The modified web document is stored for use in responding to a request for retrieval of content of the web document. Other embodiments of this aspect include corresponding systems, apparatus, and computer programs, configured to perform the actions of the methods, encoded on computer storage devices.

These and other embodiments can each optionally include one or more of the following features. The retrieved web document includes a web page, and references to resources external to the retrieved web document include at least one of a script, a style sheet, an image, or an iframe. The modified web document includes inline data associated with the resources external to the retrieved web document, wherein the inline data is not included in the retrieved web document. Parsing the retrieved web document includes rendering the retrieved web document using a headless browser. Generating the modified web document includes generating a document object model tree based on the retrieved data and at least a portion of the markup language code from the retrieved web document and generating the modified web document based on the document object model. The document object model tree is stored in an indexing database. A search results page having a link to a cached version of the retrieved web document is provided, a request for the cached version of the web document is received, and the modified web document is provided in response to the request for the cached version of the web document. A request for a preview of the web document is received, and the modified web document is provided in response to the request for the preview of the web document. Portions of the retrieved web document that can be removed without impacting the appearance of a rendered version of the web document are identified, and the identified portions are omitted from the modified web document. An image corresponding to content of the retrieved web document is generated, and the image is encoded as inline data in the modified web document.

In general, another aspect of the subject matter described in this specification can be embodied in methods that include the actions of receiving a web document having a plurality of references to resources external to the web document, and rendering the web document in a headless browser to generate a document object model tree corresponding to the web document. A modified web document including inline data not included in the web document is generated based on the document object model tree.

These and other embodiments can each optionally include one or more of the following features. Rendering the web document in a headless browser includes retrieving data from the referenced resources external to the web document. The modified web document is stored for use in rapidly retrieving a representation of the web document. Code portions of the web document to be omitted from the modified web document are identified. The inline data includes at least one of inline style code, inline script code, or inline data defining an image. The inline data includes code referenced in an iframe in the received web document. The web document is analyzed to selectively identify content from external resources to be defined in the inline data and content from external resources to be referenced in the modified web document using a reference to resources external to the modified web document. Generating the modified web document includes serializing the document object model tree to generate the modified web document having markup language.

In general, another aspect of the subject matter described in this specification can be embodied in systems that include one or more computers and one or more servers. The computers are operable to receive a web document including references to resources external to the web document, interpret the received web document to identify references to resources external to the received web document, retrieve data relating to at least a portion of the resources external to the received web document, and generate a modified web document including the retrieved data. The servers are operable to store the modified web document for use in responding to a request for retrieval of content of the web document.

These and other embodiments can each optionally include one or more of the following features. The one or more computers include one or more servers operable to execute a headless browser to interpret the received web document. The headless browser is operable to process web pages in batches. The headless browser retrieves the data relating to at least a portion of the resources external to the received web document. The one or more computers include one or more servers operable to serialize a document model to generate the modified web document. One or more web crawler servers are used for retrieving web documents including the received web document. One or more search engine servers are operable to generate search results including a link to the modified web document. The one or more computers are operable to generate the modified web document to reduce a number of retrievals of external resources required to render the modified web document relative to a number of retrievals of external resources required to render the web document. The one or more computers include a server operable to interact with the device through a data communication network, and the device is operable to interact with the server as a client.

Particular embodiments of the subject matter described in this specification can be implemented so as to realize one or more of the following advantages. By caching content (resources in addition to HTML), the latency and readability of cached pages can be improved. Cached pages may be capable of retrieval significantly faster that retrieval of the corresponding web page from its native host server. Additionally, an improved search experience can be provided when certain web sites are either inaccessible or provide a slow response by allowing a user to view a cached version of a web page that includes behaviors and features present in the actual web page (e.g., images, scripts, style sheets, etc.). Thus, a cached version of the web page can provide a user experience that is virtually identical to the original web page. Operations can be performed by, or modifications can be made (e.g., resizing fonts, extracting or copying text, and the like), by the browser. The cached version of the web page can be used to provide an offline or archived version of the web page and/or to provide a preview of the web page that can be retrieved faster than retrieving the web page and its associated resources. The cached pages can maintain links to, or instructions to retrieve, data from selected external resources to, for example, maintain accurate browsing analytics, to dynamically serve advertisements or other selected content, to avoid introducing undesirable delays in the page loading process (e.g., to avoid loading large images prior to loading other page content), and/or to more accurately track advertising impressions (e.g., statistics associated with how many times an advertisement is displayed, clicked on, etc.). The number of external resources referenced in the cached pages can be sufficiently reduced relative to the source web pages that retrieval of the cached pages can be significantly faster than retrieval of the source web pages (e.g., due to limitations on the number of HTTP requests that can be processed in parallel and reduced network round trip time as a result of the page being streamlined over a single HTTP connection, or at least fewer than the live site, which cuts down on the time needed to set up connections and transfer the document and resources). The cached version of the web page can be more efficiently encoded than the source web page, making the cached version smaller and quicker to load. Furthermore, by having resources cached together with the HTML page, it is possible to avoid situations where the contents of a stale cached page are no longer consistent with the resources from the live site.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems and techniques for modifying web pages to reduce retrieval latency. In general, the described systems and techniques can be used to reduce the number of resources that need to be retrieved and processed when rendering a web page for presentation to a user. For example, by rendering the web page with a headless browser (e.g., a web browser without a controlling terminal or user interface, which can be used to render web pages in a batch processing mode) to generate a document object model (DOM) tree and serializing the DOM tree into a modified markup language document, a version of the web page that incorporates at least a portion of retrieved resources can be generated and stored (e.g., for subsequent retrieval in lieu of the retrieving the actual page). Upon request by the web user, the modified version of the web page can be provided, reducing download latency relative to providing the original page, which requires retrieval of a greater number of resources defined external to the web page. By storing a version of the web page rendered by a headless browser, the modified version of the web page can impart a similar user experience as the original page. The modified version of the web page can be provided, for example, as a cached version of the original web page or can be provided as a preview of the original.

Figure 1:
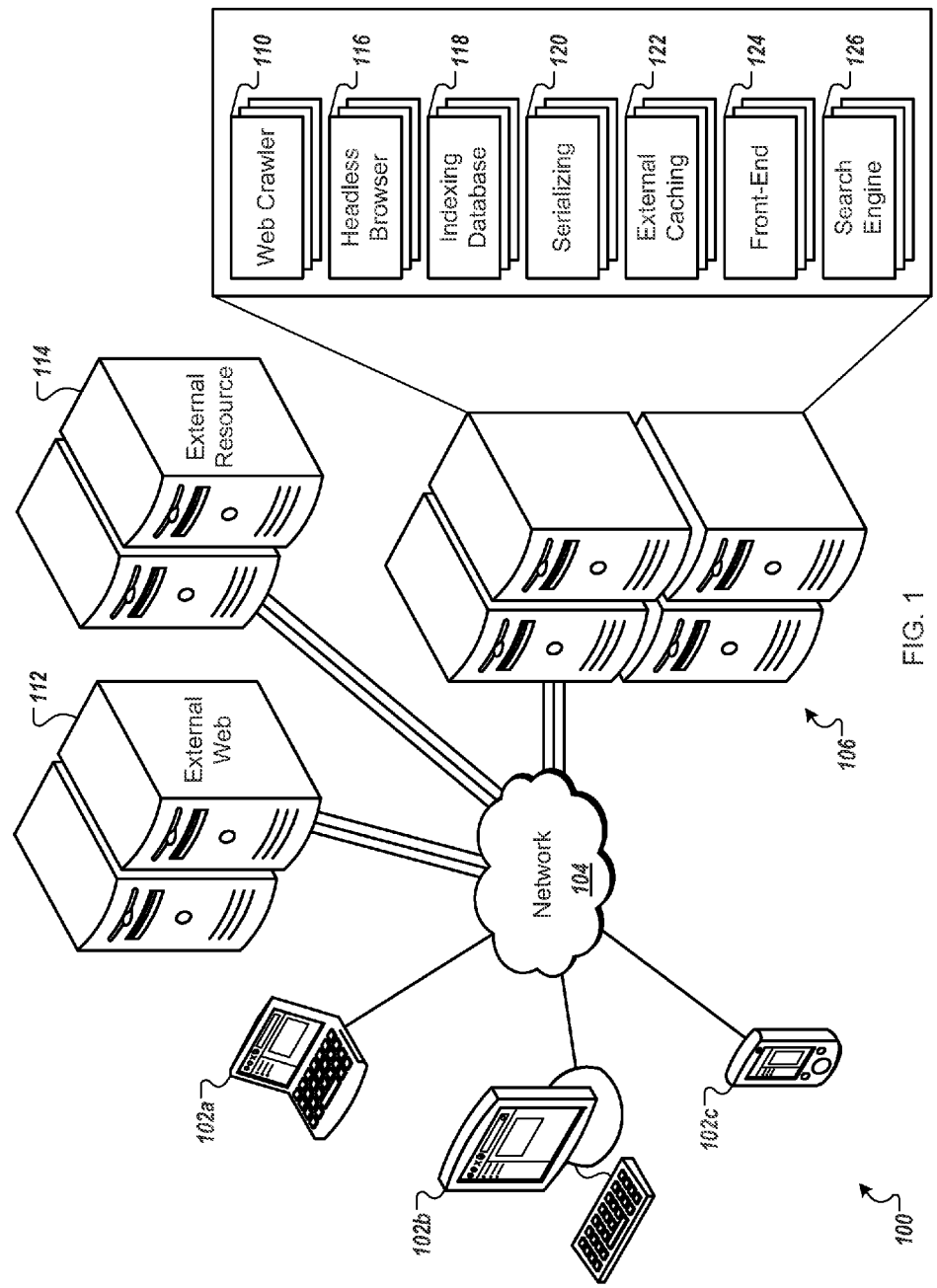
FIG. 1 is a diagram illustrating an example system for modifying web pages.

FIG. 1 is a diagram illustrating an example system 100 for modifying web pages. The system 100 can include one or more client computing devices 102a-c configured to present web pages, for example, using a web browser. In the present example, the mobile client computing devices can include a laptop computer 102a, a desktop computer 102b, and a mobile phone 102c, although other types of client computing devices (e.g., netbooks, tablets, personal digital assistants, smartphones, and the like) may also be included in the system 100. The devices 102a-c can request and receive web pages and web content via wired or wireless connections to a network 104 (e.g., the Internet). In the present example, web pages and content can be provided by one or more servers 106. Each of the servers 106 can include memory and processors configured to perform one or more operations of the system 100. In some implementations, an operation may be performed by multiple servers (e.g., a server farm) and/or multiple operations may be performed by a single server.

In the present example, a web crawler 110 can receive data associated with web pages from one or more external web servers 112. The web pages, for example, can be written in a markup language (e.g., hypertext markup language (HTML)) and can include one or more references to resources provided by one or more external resource servers 114. The external resource servers 114 can be the same or different than the external web servers 112. For example, the external resource servers 114 can store resources that are referenced in the web pages stored on the external web servers 112. Thus, the external resources are generally external to the web pages even if they are stored on and retrieve from the same server that stores the web pages. The web pages can be interpreted and rendered by a headless browser 116 to identify and retrieve the external resources, for example. In some implementations, the interpreted and rendered web pages can be stored (e.g., temporarily) by an indexing database server 118. Based at least in part on the rendered web page, a modified version of the page can be generated by a serializing server 120 (e.g., by serializing the rendered web page back into a markup language). For example, data relating to one or more resources provided by the external resource server 114 can be included in the modified version of the web page. In some implementations, the modified version of the web page can be stored by an external caching server 122 and/or a front-end server 124. Upon receiving a request for the web page from any of the client computing devices 102*a-c* (e.g., via a search engine 126), information associated with the modified version of the web page can be provided.

In the example implementation of FIG. 1, the web crawler 110 can be configured to periodically retrieve website data. Websites hosted by the external web servers 112 may change, for example, as web pages are added, updated, and removed. Additionally, for example, web pages may include resources (e.g., images, scripts, style sheets, iframes, and the like) hosted by the external resource servers 114, and web page changes may be related to changes of such resources. By periodically crawling various websites, recent versions of the websites can be obtained by the web crawler 110, thereby accounting for changes to the websites that may occur from time to time.

Website data (e.g., web pages) retrieved by the web crawler 110 can be provided to the headless browser 116 for rendering (e.g., in addition to updating search engine databases). The headless browser 116, for example, can include computer code similar to code included in standard web browsers for accessing web pages and for determining the appearances of pages. Rather than visually present web pages to users, however, the headless browser 116 can be configured to simply parse the web page, interpret all of the embedded instructions and scripts, retrieve any identified resources, and possibly provide data related to the web pages to other system operations. In some implementations, the headless browser 110 can be configured to process web pages in batches. For example, website data can be interpreted and rendered by the headless browser 110 as part of an offline process.

Generally, interpretation and rendering of a web page by the headless browser 110 can include several sub-processes. In some implementations, the headless browser 116 can be an open source web browser engine (e.g., a Webkit browser) that parses HyperText Markup Language (HTML) associated with a web page, identifies page resources (e.g., images, scripts, style sheets, iframes, and the like), and executes page scripts (e.g., JavaScript). For example, the headless browser 116 can determine that a web page hosted by the external web server 112 includes references to one or more resources hosted by the external resource server 114, and can provide resources and/or resource contents to operations for generating a modified version of the web page. In some implementations, the headless browser 116 can generate a DOM tree based on the web page. For example, the DOM tree can represent a structured version of an HTML page. In some implementations, the DOM tree (or a reference to the DOM tree) can be stored by the indexing database server 118 for further processing. A DOM tree is typically much more structured than an HTML page and can be used to automatically create a more efficient web page from a source web page.

The serializing server 120 can use the DOM tree to reconstruct the web page. For example, computer code executed by the serializing server 120 can traverse the DOM tree and serialize the tree as HyperText Markup Language (HTML). Additionally, one or more resources identified by the headless browser 116 can be inlined (e.g., data relating to the resources that is retrieved based on instructions or links in the original web page can be inserted "inline" in a modified HTML page) into the serialized HTML. For example, by inlining such resources as images, scripts, style sheets, and the like, the number of Hypertext Transfer Protocol (HTTP) requests associated with accessing a particular web page may be reduced, generally decreasing the amount of time for loading the page in a web browser. In some instances, for example, by serializing, inlining and compressing a web page from a DOM tree, the page can be significantly reduced in size (e.g., 4 times smaller) and in download time (e.g., 5 times faster). Additionally, for example, rather than downloading a web page including multiple external resources using multiple HTTP requests, a serialized and inlined web page can be downloaded using fewer HTTP requests, or, in some cases, using a single HTTP request.

Serialized and inlined pages can be stored by the external caching server 122 and/or the front-end server 124 and can be provided to users of any of the client computing devices 102*a-c*. For example, a user of the desktop computer 102*b* can use a web browser to access the search engine 126. Similarly, a user of the mobile phone 102*c* can use a mobile device browser to access the search engine 126. By interacting with a browser, for example, a device user can provide one or more search requests to the search engine 126 and can receive corresponding search results. In some implementations, the search results can include a link to the modified (e.g., serialized and inlined) web page stored by the external caching server 122. For example, the external caching server 122 can be external to the domain of the search engine 126. In some implementations, the search results can include a preview feature. For example, from a search results page provided by the search engine 126, a user can receive a preview (e.g., via an iframe, a pop-up, or some other mechanism) of the modified web page stored by the front-end server 124. Generally, by pre-executing script and/or by presenting content via an iframe, security can be maintained while presenting the modified web page. Additionally, using cookieless servers external to the search engine 126 for serving modified pages can also alleviate potential security concerns.

Figure 2:
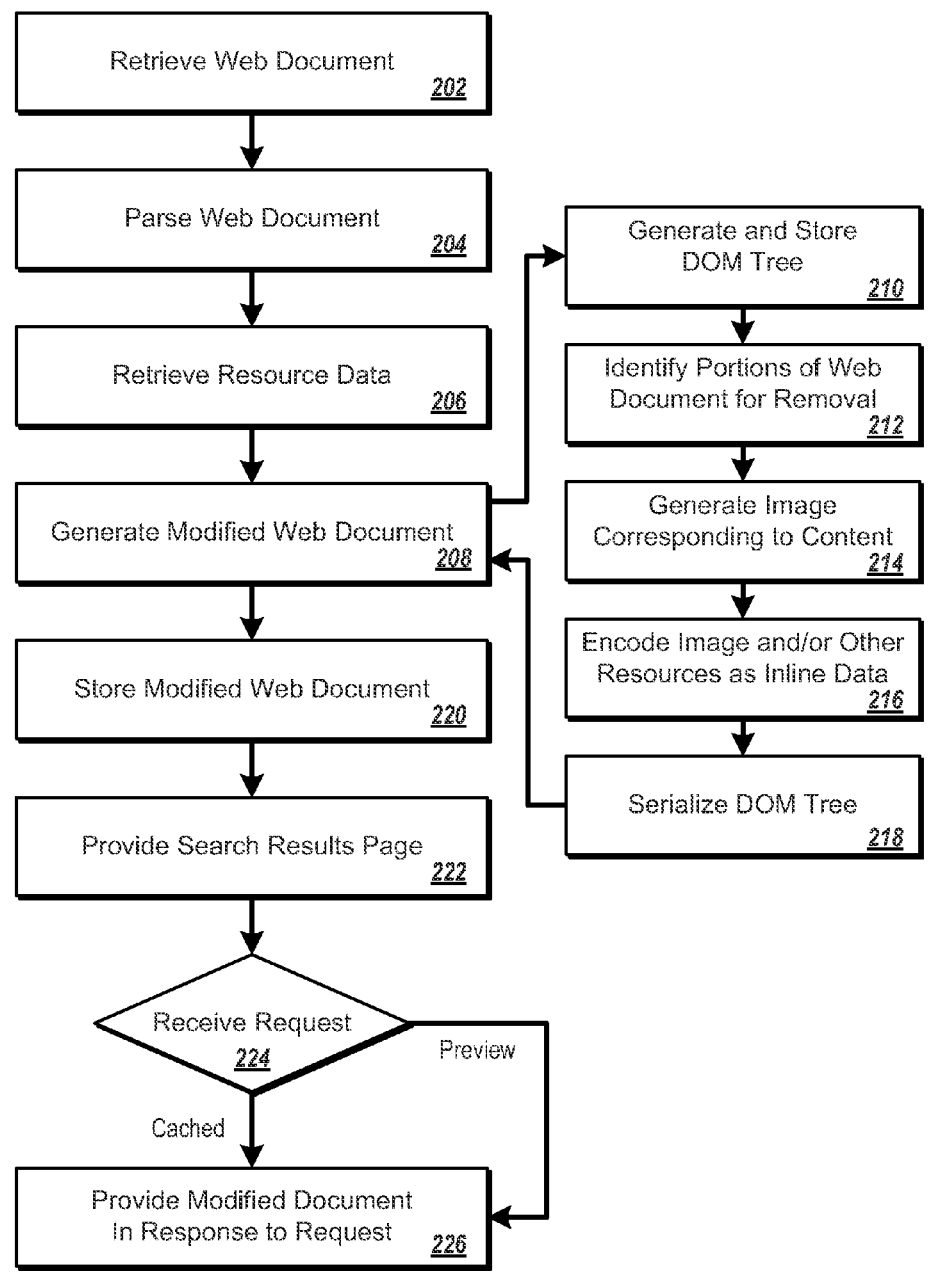
FIG. 2 is a flowchart illustrating an example process for retrieving, modifying, and storing web documents.

FIG. 2 is a flowchart illustrating an example process 200 for retrieving, modifying, and storing web documents. For example, the web documents can include web pages, or data associated with web pages. In general, web documents include any machine readable and machine storable instructions and/or data that may generate or be used to generate a display through a graphical user interface (e.g., a GUI included in any of the client computing devices 102*a-c*, shown in FIG. 1). Web documents may be a file, a combination of files, one or more files with embedded links to other files, or other configurations. Web documents may include text, audio, image, video, animation, and other attributes. Web documents may include elements written in one or more programming languages, e.g., HTML, CSS (Cascading Style Sheets), JavaScript™, and the like. In some implementations, actions represented in the flowchart can be performed by data processing apparatus included in the system 100 as shown in FIG. 1. The following description refers to the elements of the system 100 for clarity, although other systems and apparatus can be used.

As shown in FIG. 2, a web document is retrieved at 202. For example, the web document can include data associated with a web page including markup language code (e.g., HTML). Additionally, the document can include one or more references to external resources (e.g., images, scripts, style sheets, iframes, or other external resources). In some implementations, the web document can be retrieved using the web crawler 110. For example, web sites hosted on the external web server(s) 112 including one or more web documents can be periodically crawled using an offline process.

At 204, the retrieved web document is parsed. The parsing can include interpreting markup language code (e.g., HTML) included in the document, and can include identifying one or more references external to the retrieved document. In some implementations, the web document can be parsed by the headless browser 116. Additionally, for example, the headless browser 116 can render the web document. By rendering the web document, for example, the appearance and behavior of the document can be determined and modeled. Moreover, the browser can interpret scripting instructions (e.g. JavaScript) and thus both discover new resources and obtain an improved representation of the appearance and behavior of the web document.

Resource data is retrieved at 206. For example, data related to at least a portion of the resources external to the retrieved document can be retrieved. In some implementations, rendering of the web document by the headless browser 116 can also include retrieving data associated with the referenced external resources (e.g., resources hosted on the external resource server(s) 114). For example, scripts included in the web documents can be retrieved and executed by the headless browser 116, and results of the script execution (e.g., text, graphics, or the like) can be included in a rendering of the web document. In some implementations, resource data can be selectively identified and retrieved. Images larger or smaller than a particular threshold can be identified and retrieved (or not retrieved), for example. As another example, resource data of a particular type (e.g., display content, hidden content, advertising content, or some other such type) or format (e.g., text content, image content, animated content, audio content, or some other such format) can be identified and retrieved (or not retrieved).

A modified web document is generated at 208. For example, the modified web document can include at least a portion of the retrieved external resource data. In some implementations, the modified web document can be used to rapidly retrieve a representation of the retrieved web document. For example, the modified web document can provide the appearance and behavior (e.g., text and link accessibility, resizing capabilities, and the like) of the retrieved web document, while reducing latency when showing cached web pages or when showing page previews. In some implementations, generation of the modified web document can be performed by the headless browser 116, or by another computer program operating in association with the headless browser 116. The modified web document does not necessarily include all of the external resource data. For example, some references to external resource data in the web page can be retained in the modified web document, particularly if inlining such data (e.g., images or scripts) would result in degradation of certain features (e.g., speed or loss of desired dynamic features).

Generating the modified web document can include multiple sub-processes. At 210, in some implementations, a DOM tree is generated, based on the retrieved external resource data, and based on at least a portion of the markup language code from the retrieved web document. The DOM tree can be stored by the indexing database server 118, for example. In some implementations, the DOM tree can provide a structured format for the markup language code and the retrieved external resource data that can be used to generate the modified version of the retrieved web document.

At 212, portions of the retrieved web document can be identified for removal. For example, certain portions of the markup code included in the retrieved web document (e.g., hidden text, comments, and the like) can be determined to have little or no impact on the appearance or behavior of a rendered version of the retrieved web document. Thus, such portions may be omitted from the modified web document according to criteria specified for generating the modified web document.

At 214, an image corresponding to content of the retrieved web document can be generated. For example, the retrieved web document may include one or more references to animated content (e.g., Flash content and the like). By generating a static image to represent the animated content included in the retrieved document, and by including the image in place of the animated content in the modified document, for example, a streamlined version of retrieved web document can be created.

In general, the modified web document can include inline data associated with one or more resources external to the retrieved web document. For example, the inline data can include style code (e.g., Cascading Style Sheets and the like), script code (e.g., JavaScript and the like), code referenced in an iframe in the received web document, or data defining an image. At 216, the image generated at 214 (and/or other resources, e.g., JavaScript code and CSS stylesheets) can be encoded as inline data in the modified document. For example, at 216 a reference to an external image included in the retrieved web document can be used to access data associated with the image and to encode the image as inline data in the modified document. In some implementations, images or other resources can be inlined using data URIs.

At 218, in some implementations, the DOM tree is serialized. By serializing the DOM tree, a modified version of the retrieved web document can be generated that includes markup language (e.g., HTML, XML, and the like), enabling various web browsers to render the modified document. In some implementations, the DOM tree can be serialized by the serializing server(s) 120. In some implementations, multiple modified versions of the web document can be generated and serialized. For example, a cached version of the modified web document can include a reference to an external animation content resource. As another example, a preview version of the modified web document can include inlined static image data representing the animation content.

The modified web document(s) can be stored at 220. For example, the cached version of the modified web document can be stored by the external caching server 122, and the preview version of the modified web document can be stored by the front-end server 124. Access to one or both of the cached version and the preview version of the modified web document can be provided via a search results page at step 222. For example, the search results page can be provided by the search engine 126 to a web browser executed by any of the client computing devices 102a-c. By interacting with the search results page, for example, device users may request for information related to the web document. In some implementations, the search results page can include a link to the cached version of the web document. In some implementations, the search results page can include a mechanism for requesting and presenting (e.g., an iframe, a popup, or some other such mechanism) the preview version of the web document.

At 224, a user request for either or both of the cached and preview versions of the web document is received. For example, the search results page can provide user input data to the search engine 126. In response to the user input data, the modified document is provided in response to the request at 226. For example, the cached version of the web document can be provided by the external caching server in response to the user clicking the link to the cached version. As another example, the preview version of the web document can be provided by the front-end server 124 in response to user input (e.g., hovering over a web document link) associated with a request for a preview of the web document.

Figure 3A:
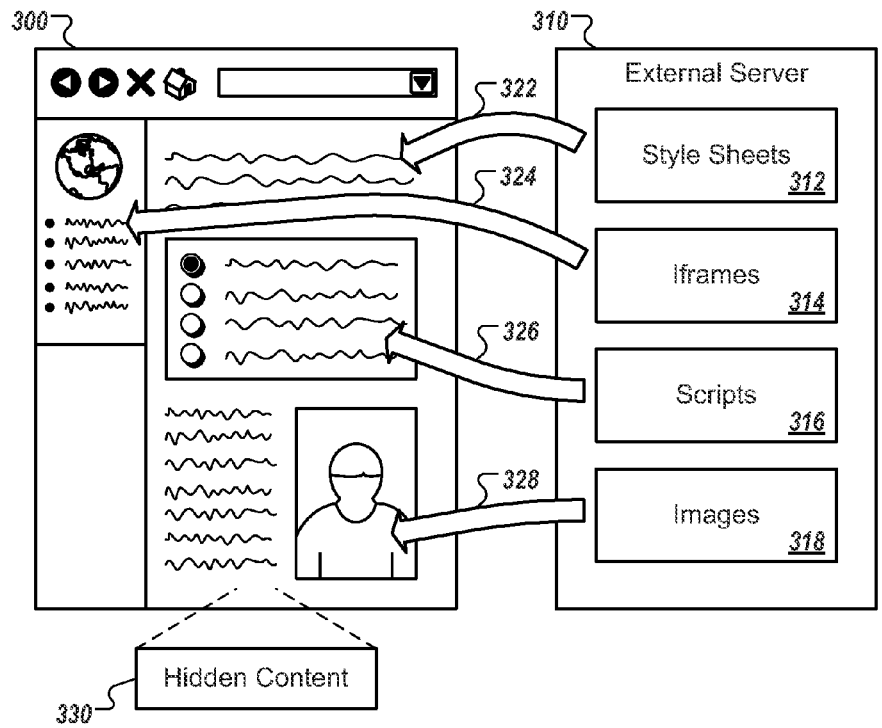
FIGS. 3A and 3B are diagrams illustrating an example transformation of a web page including inlining data and/or removing data.
Figure 3B:
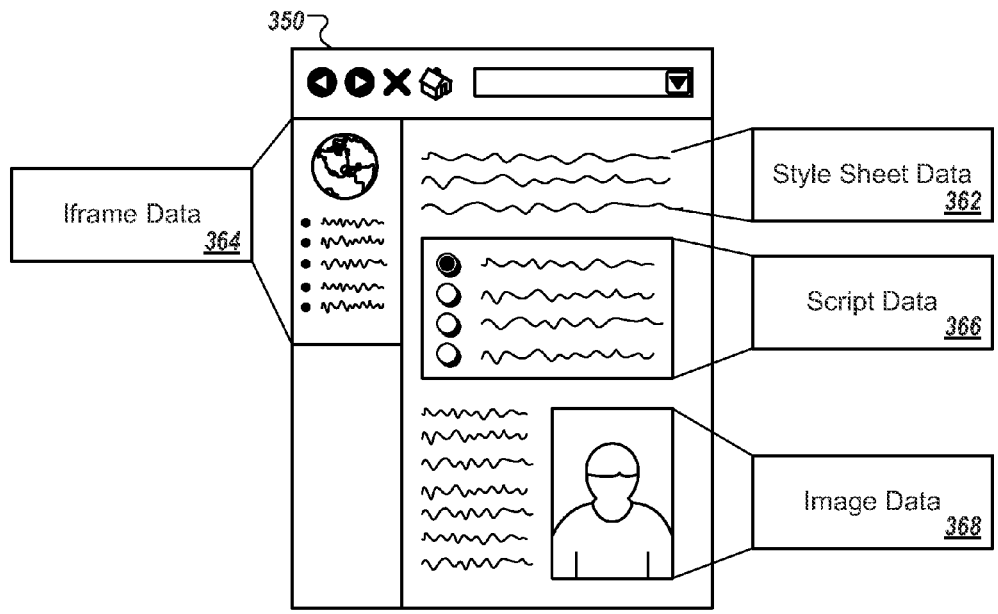

FIGS. 3A and 3B are diagrams illustrating an example transformation of a web page including inlining data and/or removing data. Web pages 300 and 350 can be presented on a user device (e.g., any of the client computing devices 102a-c, shown in FIG. 1) using a web browser or other software and can be defined by a web document provided by one or more servers (e.g., any of the servers 106, also shown in FIG. 1). In the present example, FIG. 3A illustrates the web page 300 including references to resources hosted by an external server 310, while FIG. 3B illustrates the web page 350 including at least a portion of the data associated with the resources as inline data, and at least a portion of the data removed. For example, the web page 350 can represent a modified version of the web page 300. The illustrated web pages 300, 350 are for example purposes only, and the web pages presented in accordance with the techniques described in this specification may include different or additional information.

As shown in FIG. 3A, the web page 300 includes references to resources stored by the external server 310. For example, the external server 310 can store content data related to one or more style sheets 312, iframes 314, scripts 316, and images 318. In some implementations, other sorts of content data, such as animation content, video content, audio content, and the like may be stored by the external server 310. In some implementations, content data may be stored by multiple servers. For example, the style sheets 312 can be stored by a server, and other sorts of content can be stored by a different server. As another example, a subset of the scripts 316 can be stored by a first server, and a different subset of the scripts 316 can be stored by a different server.

In some implementations, resource data can be referenced by the web page 300 using tags or links included in HTML used for rendering the page. For example, one or more of the style sheets 312 hosted by the external server 310 can be referenced within the web page 300. Generally, by providing HTML, e.g., as a Link tag including rel="stylesheet" and an "href" attribute designating a resource location (e.g., a URL), the web page 300 can reference one or more of the style sheets 312. Upon rendering the web page 300, for example, an HTTP request can be made by a browser displaying the web page 300 for the referenced style sheet(s) 312. As shown by arrow 322, style sheet data can be provided by the external server 310 to the browser and applied to the web page 300.

Similarly, for example, data associated with one or more of the iframes 314 hosted by the external server 310 can be referenced within the web page 300. Generally, by providing HTML such as an <iframe> tag and a "src" (source) attribute designating a resource location, the web page 300 can reference one or more web documents to be included in one or more iframes. Upon rendering the web page 300, for example, an HTTP request can be made by a browser displaying the web page 300 for web documents to be included in the iframe(s). As shown by arrow 324, document data can be provided by the external server 310 and applied to one or more iframes included in the web page 300.

As another example, one or more of the scripts 316 (e.g., JavaScript and the like) hosted by the external server 310 can be referenced within the web page 300. Generally, by providing HTML such as a <script> tag and a "src" attribute designating a resource location, the web page 300 can reference one or more of the scripts 316. Upon rendering the web page 300, for example, an HTTP request can be made by a browser displaying the web page 300 for the referenced script(s) 316. As shown by arrow 326, script data can be provided by the external server 310 to the browser and interpreted in the context of the web page 300.

As another example, one or more of the images 318 (e.g., JPG files, GIF files, PNG files, and other such content) hosted by the external server 310 can be referenced within the web page 300. Generally, by providing HTML such as an <img> tag and a "src" attribute designating a resource location, the web page 300 can reference one or more of the images 318. Upon rendering the web page 300, for example, an HTTP request can be made by a browser displaying the web page 300 for the referenced image(s) 318. As shown by arrow 328, image data can be provided by the external server 310 to the browser and can be rendered within the web page 300.

In some cases, the web page 300 can include hidden content 330. For example, the hidden content 330 can include content determined to not affect the appearance or behavior of the web page 300, such as hidden text, comments, metadata, and the like. In some implementations, the hidden content 330 can be included using HTML tags, such as comment tags, meta tags, and the like.

As shown in FIG. 3B, in the present example, the web page 350 includes inlined data corresponding to the data provided by the external server 310. Generally, data can be inlined by replacing references to content stored by an external server (e.g., the external server 310) with inlined references to the content. For example, external content data can be retrieved (e.g., by the headless browser 116, shown in FIG. 1) and can be used for generating the web page 350 (e.g., a modified version of the web page 300). For example, the web page 350 can include inlined style sheet data 362, inlined iframe data 364, inlined script data 366, and inlined image data 368. In some implementations, other sorts of data may be inlined, such as animation data, video data, audio data, and the like.

Various transformations can be performed to generate the web page 350. For example, the <base> tag of the document can be modified when serving the cached page, so that relative links point to the live page. In addition, to inline the style sheet data 362, an external CSS file (e.g., "<link rel="stylesheet">") can be replaced with an inline <style> block, similar to how scripts are inlined. Alternatively, the characteristics of the style sheet can be encoded using inline HTML style attributes. To inline the script data 366, for example, external script tags can be modified to converted to inlined script tags, and corresponding script content can be included in the web page 350 as an inline script block. As another possibility, the script can be pre-executed, and results of the script can be included in the web page 350. For example, images and/or text produced by executing the script can be inlined and encoded directly into the modified web page, thereby removing the script from the modified web page. In some implementations, one or more static images representing video or animation (e.g., Flash) content can be generated and inlined in place of such content.

In some implementations, data URIs (Uniform Resource Identifiers) can be used to inline content data. For example, the image data 368 can be inlined using data URIs. The binary contents of the image data 368, for example, can be associated with the data URI and included in the web page 350 as a Base64-encoded string. Various images can be inlined using data URIs, for example. In some implementations, images included on the web page 350 can be inlined. In some implementations, images associated with style sheets (e.g., background images) can be inlined. In some implementations, at least a portion of the iframe data 364 can be inlined using data URIs.

Content from external resources can be selectively identified, in some implementations. For example, certain content can be selectively identified to be inlined in the web document 350, and certain content can be selectively identified to be referenced as an external resource. In some implementations, content size can be used as a factor in selectively identifying such content. For example, images under a particular size threshold can be inlined (e.g., as image data 368), and images over a particular size threshold can be referenced as an external resource. In some implementations, position of content within the web document 350 can be used as a factor in selectively identifying such content (e.g., content higher in the page layout ("above-the-fold" content) can be selectively inlined while the same or similar content is not inlined if it appears lower in the page). In some implementations, functional characteristics can be used as a factor in selectively identifying such content. For example, scripting code related to ads or analytics (e.g., used to track information regarding viewing of ads or quality or relevance of a particular search result) can be referenced as an external resource, and other types of scripting code can be inlined (e.g., as script data 366). In some implementations, a user's web browser can be used as a factor in determining whether to serve a web document containing inlined content or a web document containing referenced content. For example, some modern browsers may have improved capabilities for rendering certain types of inlined content as compared with legacy browsers. Thus, a decision on whether to, for example, inline content, generate a static image corresponding to the content, maintain an external reference, or omit certain data can be made based on the type of browser or the operating environment of the user's client device.

In some implementations, a portion of the data included in a web page can be removed when generating a modified webpage. For example, the hidden content 330 included in the web page 300 can be excluded from the web page 350. By removing content determined to have little or no impact on the appearance or behavior of the web page 300, for example, the web page 350 having substantially similar appearance and behavior, with improved latency. Additionally, for example, by reducing the number of retrievals of external resources (e.g., resources hosted by the external server 310) required to render the web document 350 relative to the number of retrievals required for rendering the web document 300, latency and rendering times can be improved.

Figure 4:
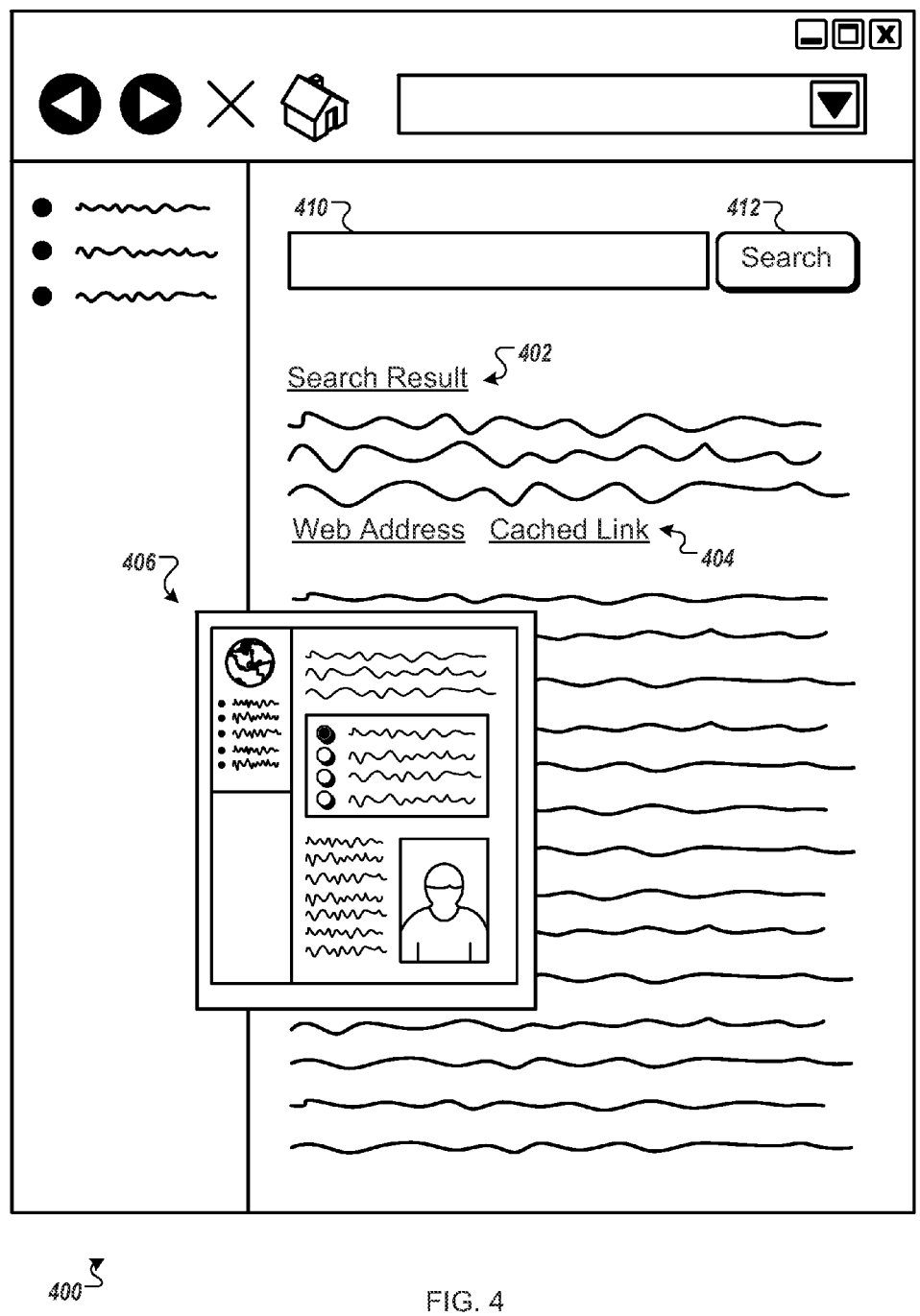
FIG. 4 is an example web page including search results, a cached link, and a preview feature.

FIG. 4 is an example web page 400 including search results 402, a cached link 404, and a preview 406 feature. The web pages 400 can be presented on a user device (e.g., any of the client computing devices 102a-c, shown in FIG. 1) using a web browser, for example, and can be defined by a web document provided by one or more servers (e.g., any of the servers 106, also shown in FIG. 1).

As shown in FIG. 4, a search entry control 410 is provided enabling a user to enter one or more search parameters. Upon entering the search parameters, the user can submit a search request to a search engine (e.g., the search engine 126, shown in FIG. 1) by interacting with the search submission control 412, and can receive a set of search results including the search result 402. In some implementations, in association with the search result 402, the web page 400 can present the cached link 404 to the user. For example, by clicking the cached link 404, the user can receive information related to a cached version (e.g., stored by the external caching server 122) of a web document corresponding to the search result 402.

In some implementations, in addition to or instead of the cached link 404, the web page 400 can present the preview 406 (e.g., stored by the front-end server 124) to the user. For example, the preview 406 can be presented within an iframe, a pop-up, or some other such mechanism. In some implementations, the preview 406 can be presented based on user interaction. For example, if the user hovers over the search result 402 (or some other such location) using a pointing device, the preview 406 can be presented. In some implementations, the preview 406 can be presented in a split-pane interface.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the described techniques can be used so that a browser accesses modified web pages from a known web server in parallel with the corresponding live web page to provide a preview or "splash-screen" while the user is waiting for the live site to be loaded. Moreover, a web publisher can use the described to proxy web connections and provide modified web pages instead of the live sites.

What is claimed is:
1. A method, comprising:
  independent of receipt of a search request:

retrieving a plurality of web documents, each web document including markup language code and at least one reference to a resource external to the web document;

parsing each of the plurality of retrieved web documents, by operation of a computer, to interpret the markup language code and to identify the at least one reference to a resource external to the web document;

retrieving referenced data from the resource external to each of the plurality of retrieved web documents;

adding, by operation of a computer, to each web document of the plurality of web documents, retrieved referenced data associated with the web document, to generate a plurality of modified web documents, wherein each modified web document contains the retrieved referenced data associated with the modified web document and the interpreted markup language code, and wherein generating a particular modified web document includes:

generating a document object model tree based on the retrieved referenced data and at least a portion of the interpreted markup language code from the associated retrieved web document; and generating the particular modified web document based on the document object model tree; and storing each of the plurality of modified web documents for use in responding to a request for retrieval of content for a particular web document;

receiving a search request; and returning, in response to the search request, a plurality of search results, each search result that is associated with a retrieved one of the plurality of web documents comprising an image preview of and a link to a particular stored modified web document associated with the retrieved web document, the image preview visually displayed adjacent to the search result and providing a static representation of a visual appearance of the modified web document.

2. The method of claim 1, wherein a particular retrieved web document comprises a web page including at least one of a script, a style sheet, an image, or an iframe.

3. The method of claim 1, wherein a particular modified web document includes inline data associated with the resource external to an associated retrieved web document, and wherein the inline data is not included in the associated retrieved web document.

4. The method of claim 1, wherein parsing a particular retrieved web document includes rendering the particular retrieved web document using a headless browser.

5. The method of claim 1, further comprising storing the document object model tree in an indexing database.

6. The method of claim 1, further comprising:
receiving a request for a particular stored modified web document; and
providing the particular stored modified web document.

7. The method of claim 1, further comprising:
receiving a request for a preview of a particular stored modified web document; and
providing the particular stored modified web document.

8. The method of claim 1, further comprising identifying portions of a particular retrieved web document to remove without impacting the appearance of a rendered version of the particular retrieved web document, wherein the identified portions are omitted from the associated modified web document.

9. The method of claim 1, further comprising:
generating an image corresponding to content of a particular retrieved web document; and encoding the image as inline data in the associated modified web document.

10. A computer-program product, comprising computer-readable instructions embodied on tangible, non-transitory media, the computer-readable instructions operable when executed to:

independent of receipt of a search request:

retrieve a plurality of web documents, each web document including markup language code and at least one reference to a resource external to the web document;

parse each of the plurality of retrieved web documents to interpret the markup language code and to identify the at least one reference to a resource external to the web document;

retrieve referenced data from the resource external to each of the plurality of retrieved web documents;

add to each web document of the plurality of web documents, retrieved referenced data associated with the web document, to generate a plurality of modified web documents, wherein each modified web document contains the retrieved referenced data associated with the modified web document and the interpreted markup language code, and wherein generating a particular modified web document includes instructions to:

generate a document object model tree based on the retrieved referenced data and at least a portion of the interpreted markup language code from the associated retrieved web document; and generate the particular modified web document based on the document object model tree; and store each of the plurality of associated modified web documents for use in responding to a request for retrieval of content for a particular web document;

receive a search request; and return, in response to the search request, a plurality of search results, each search result that is associated with a retrieved one of the plurality of web documents comprising an image preview of and a link to a particular stored modified web document associated with the retrieved web document, the image preview visually displayed adjacent to the search result and providing a static representation of a visual appearance of the modified web document.

11. The computer-program product of claim 10, wherein a particular web document comprises a web page including at least one of a script, a style sheet, an image, or an iframe.

12. The computer-program product of claim 10, wherein a particular modified web document includes inline data associated with the resource external to an associated retrieved web document, and wherein the inline data is not included in the associated retrieved web document.

13. The computer-program product of claim 10, wherein parsing a particular retrieved web document includes rendering the particular retrieved web document using a headless browser.

14. The computer-program product of claim 10, further comprising instructions operable to store the document object model tree in an indexing database.

15. The computer-program product of claim 10, further comprising instructions operable to:
receive a request for a particular stored modified web document; and
provide the particular stored modified web document.

16. The computer-program product of claim 10, further comprising instructions operable to:

receive a request for a preview of a particular stored modified web document; and provide the particular stored modified web document.

17. The computer-program product of claim 10, further comprising instructions operable to identify portions of a particular retrieved web document to remove without impacting the appearance of a rendered version of the particular retrieved web document, wherein the identified portions are omitted from the associated modified web document.

18. The computer-program product of claim 10, further comprising instructions operable to:

generate an image corresponding to content of a particular retrieved web document; and encode the image as inline data in the associated modified web document.

19. A system, comprising:

memory storing a plurality of web documents, each web document including markup language code and at least one reference to a resource external to the web document; and at least one processor interoperably coupled to the memory and configured to:

independent of receipt of a search request:

retrieve the plurality of web documents, each web document including markup language code and at least one reference to a resource external to the web document;

parse each of the plurality of retrieved web documents to interpret the markup language code and to identify the at least one reference to a resource external to the web document;

retrieve referenced data from the resource external to each of the plurality of retrieved web documents;

add to each web document of the plurality of web documents, retrieved referenced data associated with the web document, to generate a plurality of modified web documents, wherein each modified web document contains the retrieved referenced data associated with the modified web document and the interpreted markup language code, and wherein generating a particular modified web document includes instructions to:

generate a document object model tree based on the retrieved referenced data and at least a portion of the interpreted markup language code from the associated retrieved web document; and generate the particular modified web document based on the document object model tree; and store each of the plurality of associated modified web documents for use in responding to a request for retrieval of content for a particular web document;

receive a search request; and return, in response to the search request, a plurality of search results, each search result that is associated with a retrieved one of the plurality of web documents comprising an image preview of and a link to a particular stored modified web document associated with the retrieved web document, the image preview visually displayed adjacent to the search result and providing a static representation of a visual appearance of the modified web document.

20. The system of claim 19, wherein a particular web document comprises a web page including at least one of a script, a style sheet, an image, or an iframe.

21. The system of claim 19, wherein a particular modified web document includes inline data associated with the resource external to an associated retrieved web document, and wherein the inline data is not included in the associated retrieved web document.

22. The system of claim 19, wherein parsing a particular retrieved web document includes rendering the particular retrieved web document using a headless browser.

23. The system of claim 19, further configured to store the document object model tree in an indexing database.

24. The system of claim 19, further configured to:

receive a request for a particular stored modified web document; and provide the particular stored modified web document.

25. The system of claim 19, further configured to:

receive a request for a preview of a particular stored modified web document; and provide the particular stored modified web document.

26. The system of claim 19, further configured to identify portions of a particular retrieved web document to remove without impacting the appearance of a rendered version of the particular retrieved web document, wherein the identified portions are omitted from the associated modified web document.

27. The system of claim 19, further configured to:

generate an image corresponding to content of a particular retrieved web document; and encode the image as inline data in the associated modified web document.

* * * * *